US012398698B2

(12) United States Patent
Kong et al.

(10) Patent No.: US 12,398,698 B2
(45) Date of Patent: Aug. 26, 2025

(54) WIND POWER GENERATION APPARATUS

(71) Applicant: BITMAIN TECHNOLOGIES INC., Beijing (CN)

(72) Inventors: Guowei Kong, Beijing (CN); Minghao Li, Beijing (CN); Fengjie Li, Beijing (CN); Shuangquan Hua, Beijing (CN); Wenkai Cui, Beijing (CN); Fei Wang, Beijing (CN); Gaofei Pan, Beijing (CN); Li Zou, Beijing (CN); Tuo Geng, Beijing (CN); Qiwei Bai, Beijing (CN)

(73) Assignee: BITMAIN TECHNOLOGIES INC., Beijing (CN)

( * ) Notice: Subject to any disclaimer, the term of this patent is extended or adjusted under 35 U.S.C. 154(b) by 0 days.

(21) Appl. No.: 18/778,785

(22) Filed: Jul. 19, 2024

(65) Prior Publication Data
US 2025/0027478 A1 Jan. 23, 2025

(30) Foreign Application Priority Data

Jul. 21, 2023 (CN) .......................... 202321945412.3

(51) Int. Cl.
F03D 9/17 (2016.01)
(52) U.S. Cl.
CPC .......... F03D 9/17 (2016.05); F05B 2220/706 (2013.01); F05B 2260/60 (2013.01)

(58) Field of Classification Search
CPC .. F03D 9/17; F05B 2220/706; F05B 2260/60; Y02E 10/72
See application file for complete search history.

(56) References Cited

U.S. PATENT DOCUMENTS

| | | | |
|---|---|---|---|
| 2012/0119514 A1* | 5/2012 | Crane | F03D 9/25 290/1 R |
| 2017/0101981 A1* | 4/2017 | Ozcan | F03D 80/80 |
| 2020/0116129 A1* | 4/2020 | Oelofse | F03D 9/10 |
| 2020/0240394 A1* | 7/2020 | Dragonas | F04B 35/01 |

* cited by examiner

Primary Examiner — Joseph Ortega

(57) ABSTRACT

The present disclosure provides a wind power generation apparatus, including a fan configured to obtain wind energy; a first generator, connected with the fan and a load and configured to convert the wind energy obtained by the fan into first electric energy and output the first electric energy to the load; a gas storage module, connected between the first generator and the load and configured to store or release gas; where when an output power of the first generator is greater than a load power of the load, the first generator drives the gas storage module to store a gas; and when the output power of the first generator is lower than the load power, the gas storage module releases a stored gas to generate second electric energy and output the second electric energy to the load.

12 Claims, 3 Drawing Sheets

WIND POWER GENERATION APPARATUS

CROSS-REFERENCE TO RELATED APPLICATION

This present application claims priority to Chinese Patent Application No. 202321945412.3, filed on Jul. 21, 2023, which is hereby incorporated by reference in its entirety.

TECHNICAL FIELD

The present disclosure relates to the field of wind power generation, in particular to a wind power generation apparatus.

BACKGROUND

With the large-scale development of new energy wind power generation, the composition form, response range, interaction mode and network topology between wind power generation and load are more diversified. In order to improve energy use efficiency, the demand for wind power generation and the local consumption of load in an independent wind power generation system, i.e., off-grid wind power generation system, is increasing.

SUMMARY

In view of this, embodiments of the present disclosure provide a wind power generation apparatus.

The technical solution of the present disclosure is realized as follows.

An embodiment of the present disclosure provides a wind power generation apparatus, including:
- a fan, configured to obtain wind energy;
- a first generator, connected with the fan and a load and configured to convert the wind energy obtained by the fan into first electric energy and output the first electric energy to the load;
- a gas storage module, connected between the first generator and the load and configured to store or release gas;
- where when an output power of the first generator is greater than a load power of the load, the first generator drives the gas storage module to store a gas; when the output power of the first generator is lower than the load power, the gas storage module releases a stored gas to generate second electric energy and outputs the second electric energy to the load.

In some embodiments, the wind power generation apparatus further includes a pneumatic heat dissipation module;
- the pneumatic heat dissipation module is connected with the gas storage module and is configured, to dissipate heat for the load based on a gas released by the gas storage module.

In some embodiments, the gas storage module includes an air compressor, a first gas cylinder and a second generator;
- the air compressor is respectively connected with the first generator and the first gas cylinder and is configured to compress a gas to the first gas cylinder under drive of the first generator; and
- the second generator is connected with the first gas cylinder and the load, and is configured to generate the second electric energy under drive of a gas released by the first gas cylinder and output the second electric energy to the load.

In some embodiments, the gas storage module further includes a first valve and a second valve;
- the first valve is arranged between the air compressor and the first gas cylinder;
- the second valve is arranged between the first gas cylinder and the second generator and is configured to control a first gas release amount of the first gas cylinder when releasing gas;
- where, when the air compressor compresses a gas to the first gas cylinder, the first valve is opened and the second valve is closed; when the first gas cylinder releases a gas, the second valve is opened and the first valve is closed.

In some embodiments, the wind power generation apparatus further includes a first switch, a second switch and a third switch;
- the first switch is connected between the fan and the load;
- the second switch is connected between the first generator and the air compressor; and
- the third switch is connected between the second generator and the load;
- where, when the output power of the first generator is greater than the load power of the load, the third switch is turned off, and the first switch and the second switch are turned on; and
- when the output power of the first generator is lower than the load power, the second switch is turned off, and the first switch and the third switch are turned on.

In some embodiments, the gas storage module further includes a second gas cylinder;
- the second gas cylinder is connected with the first gas cylinder through a third valve;
- and/or,
- the second gas cylinder is connected with the air compressor through the first valve.

In some embodiments, the pneumatic heat dissipation module includes a pneumatic motor and a heat dissipation fan;
- the pneumatic motor is connected with the second gas cylinder and the heat dissipation fan, and is configured to provide a driving power for the heat dissipation fan under drive of a gas released by the second gas cylinder; and
- the heat dissipation fan is configured to dissipate heat for the load.

In some embodiments, the pneumatic heat dissipation module further includes a fourth valve;
- the fourth valve is arranged between the second gas cylinder and the pneumatic motor, and is configured to control a second gas release amount of the second gas cylinder when releasing gas.

In some embodiments, the second generator is a turbine generator.

The technical solutions provided by the embodiments of the present disclosure can have the following beneficial effects:

A gas storage module is connected between a first generator and a load, and when an output power of the first generator is greater than a load power of the load, the first generator drives the gas storage module to store a gas; when the output power of the first generator is lower than the load power, the gas storage module releases a stored gas to generate second electric energy and outputs the second electric energy to the load. In this way, a working mode of the gas storage module may be dynamically adjusted according to the output power of the first generator and the load power required by the load side in the wind power generation system. When the output power is greater than the load power, a portion of the output power that is generated by the first generator and exceeds a load capacity of the load is consumed by the gas storage module and converted into a gas to be stored, thereby protecting the load device without using a battery and an unloader, and improving the safety while reducing the cost; and when the output power is lower than the load power, the gas is released to generate second electric energy to directly compensate the electric power for the load; in addition, a pneumatic heat dissipation module can also be used to dissipate heat for the load based on a gas released by the gas storage module, which reduces the possibility of damage to the load caused by overheating in operation of the load and enhances the service life of the load.

It should be understood that the above general description and the following detailed description are only exemplary and explanatory, the present disclosure is not limited thereto.

BRIEF DESCRIPTION OF DRAWINGS

The accompanying drawings herein are incorporated into and constitute a part of this specification, they illustrate embodiments conforming to the present disclosure, and are used together with the specification to explain the principles of the present disclosure.

DESCRIPTION OF REFERENCE NUMERALS

Figure 1:
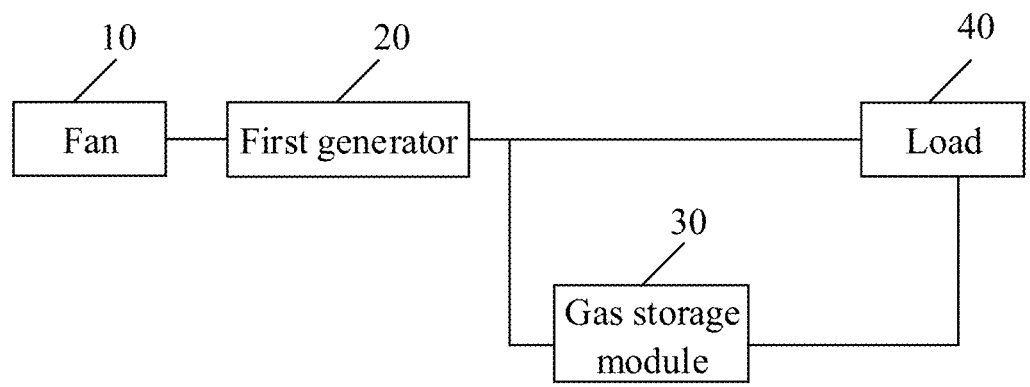
FIG. 1 is a schematic diagram of a framework of a wind power generation apparatus provided by an embodiment of the present disclosure.

10: fan; 20: first generator; 30: gas storage module; 40: load; 50: pneumatic heat dissipation module; 21: converter; 212: DC converter; 211: AC converter; 22: transformer; 61: first switch; 62: second switch; 63: third switch; 31: air compressor; 32: first gas cylinder; 33: second gas cylinder; 34: second generator; 35: first valve; 36: second valve; 37: frequency converter; 51: pneumatic motor; 52: heat dissipation fan; 53: fourth valve.

DESCRIPTION OF EMBODIMENTS

The exemplary implementations, which are illustrated in the accompanying drawings, will be described in detail herein. When the following description refers to the accompanying drawings, unless otherwise indicated, the same numbers in different accompanying drawings indicate the same or similar elements. The implementations described in the following exemplary implementations do not represent all implementations consistent with the present disclosure. Rather, they are merely examples of apparatuses consistent with some aspects of the present disclosure as detailed in the appended claims.

The terms used in the present disclosure are for the purpose of describing specific implementations only and are not intended to limit the present disclosure. Unless otherwise defined, technical terms or scientific terms used in the present disclosure shall have ordinary meanings as understood by those of ordinary skill in the art to which the present disclosure pertains. The words "first", "second" and similar words used in the specification and claims of the present disclosure do not indicate any order, quantity or importance, but are only used to distinguish different components. Similarly, "a" or "an" or other similar words do not mean quantity limitation, but mean that there is at least one; and "multiple" or "several" means two or more. Unless otherwise specified, "front", "rear", "lower" and/or "upper" or other similar words are only for convenience of explanation, and are not limited to a position or a spatial orientation; "include" or "contain" or other similar words indicates that the elements or objects existing before "include" or "contain", cover the elements or objects listed after "include" or "contain" and the equivalents thereof, but not exclude other elements or objects; and "connect to" or "connect with" are not limited to physical or mechanical connection, but may include electrical connection, whether direct or indirect.

For the current off-grid wind power generation system, due to the instability of wind power generation, there may be a situation where too much electricity is generated in the process of power generation. At this time, the power generated by the wind power generation system must be limited by a battery combined with an unloader or a pitch, otherwise the load will be damaged. Under this condition, on one hand, it is difficult to increase the power demand on the load side under the power limitation by the battery combined with the unloader or pitch; and on the other hand, the use of the battery will lead to complexity and high cost of the energy control system in the wind power generation system, and there is a fire hazard.

Referring to FIG. 1 to FIG. 4, an embodiment of the present disclosure provides a wind power generation apparatus, including:
  a fan 10, configured to obtain wind energy;
  a first generator 20, connected with the fan 10 and a load and configured to convert the wind energy obtained by the fan 10 into first electric energy and output it to the load; and
  a gas storage module 30, connected between the first generator 20 and a load and configured to store or release gas;
  where, when an output power of the first generator 20 is greater than a load power of the load, the first generator 20 drives the gas storage module 30 to store a gas; when the output power of the first generator 20 is lower than the load power, the gas storage module 30 releases a stored gas to generate second electric energy and outputs it to the load.

In the present embodiment, the wind power generation apparatus is an off-grid wind power generation apparatus and further includes a converter 21, where the converter 21 includes an AC converter 211 and a DC converter 212.

Specifically, the first generator 20 converts the wind energy obtained by the fan 10 into mechanical energy, and then converts the mechanical energy into electrical energy. In this process, the instability of wind speed and the device itself will affect the rotation of the first generator, so the electric energy generated by the first generator fluctuates greatly. It is necessary to rectify an alternating current generated by the first generator through the converter, so as to improve the electrical energy quality and reduce the impact of unstable output power on the load.

In the present embodiment, a gas storage module is connected between a first generator and a load, and when an output power of the first generator is greater than a load power of the load, the first generator drives the gas storage module to store a gas; and when the output power of the first generator is lower than the load power, the gas storage module releases a stored gas to generate second electric energy and outputs it to the load. In this way, a working mode of the gas storage module is dynamically adjusted according to the output power of the first generator and the load power required by the load side in the wind power generation system. When the output power is greater than the load power, a portion of the output power that is generated by the first generator and exceeds a load capacity of the load is consumed by the gas storage module and converted into a gas to be stored, thereby protecting the load device without using a battery and an unloader, and improving the safety while reducing the cost; and when the output power is lower than the load power, a gas is released to generate second electric energy to directly compensate the electric power for the load.

In a possible implementation, when the output power of the first generator is greater than the load power of the load, the first generator can use a surplus power to drive the gas storage module to store gas.

Exemplarily, the gas storage module may include an air compressor, a gas cylinder, and the like. The first generator can use surplus electric energy to drive the air compressor to compress gas (such as air) and store the compressed gas in the gas cylinder.

Figure 2:
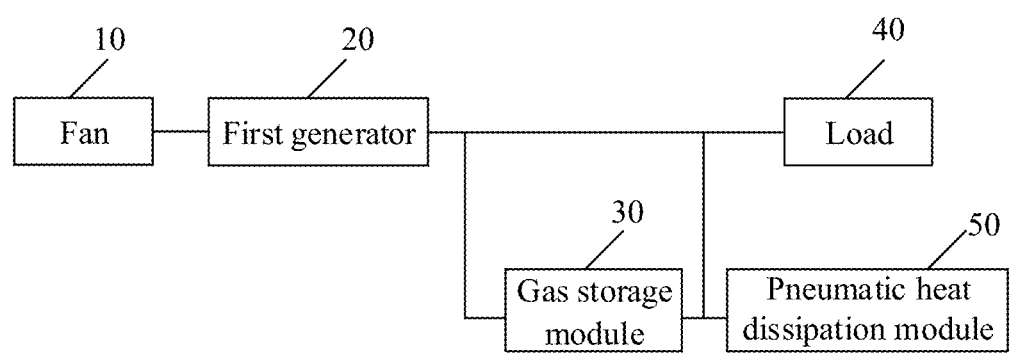
FIG. 2 is another schematic diagram of a framework of a wind power generation apparatus provided by an embodiment of the present disclosure.

In some embodiments, as shown in FIG. 2, the wind power generation apparatus further includes a pneumatic heat dissipation module 50; and the pneumatic heat dissipation module 50 is connected with the gas storage module 30, and is configured to dissipate heat for the load based on the gas released by the gas storage module 30.

Exemplarily, when the output power of the first generator 20 is greater than the load power of the load 40, the gas storage module 30 releases part of the gas to the pneumatic heat dissipation module 50 to drive the pneumatic heat dissipation module 50 to dissipate heat for the load 40, while storing gas.

Exemplarily, when the output power of the first generator 20 is lower than the load power of the load 40, the gas storage module 30 releases the gas, which, on one hand, compensates the electric power for the load, and on the other hand, drives the pneumatic heat dissipation module 50 to dissipate heat for the load 40.

It should be noted that in the present embodiment, the gas storage module not only realizes protection of the load device by converting an extra output power into a gas to be stored by means of gas storage when the first generator generates electric energy that exceeds a load capacity of the load, but also realizes the heat dissipation of the load based on the extra output power, which reduces the possibility of damage to the load caused by overheating in operation of the load and enhances the service life of the load.

In some embodiments, the wind power generation apparatus further includes a transformer 22; and the transformer is configured to adjust a voltage of the first electric energy produced by conversion of the first generator to a predetermined voltage.

Exemplarily, a voltage generated by the wind power generation apparatus can be 690V or 620V, or can be dynamically adjusted according to an actual demand for the wind power generation apparatus.

In an embodiment, when the voltage generated by the wind power generation apparatus is 690V, the predetermined voltage is 380V. Specifically, the transformer regulates a first electric energy of 690V and 50 Hz generated by conversion of wind energy through the first generator to a predetermined voltage of 380V and 50 Hz.

In some embodiments, the gas storage module 30 includes an air compressor 31, a first gas cylinder 32 and a second generator 34;

the air compressor 31 is connected with the first generator 20 and the first gas cylinder 32 respectively, and is configured to compress a gas to the first gas cylinder 32 under the drive of the first generator 20;

the second generator 34 is connected with the first gas cylinder 32 and the load 40, and is configured to generate second electric energy under the drive of a gas released from the first gas cylinder 32 and output it to the load 40.

In some embodiments, the gas storage module 30 further includes a second gas cylinder 33; the second gas cylinder is connected with the first gas cylinder 32 through a third valve (not shown); and/or the second gas cylinder is connected with the air compressor 31 through a first valve 35.

Figure 3:
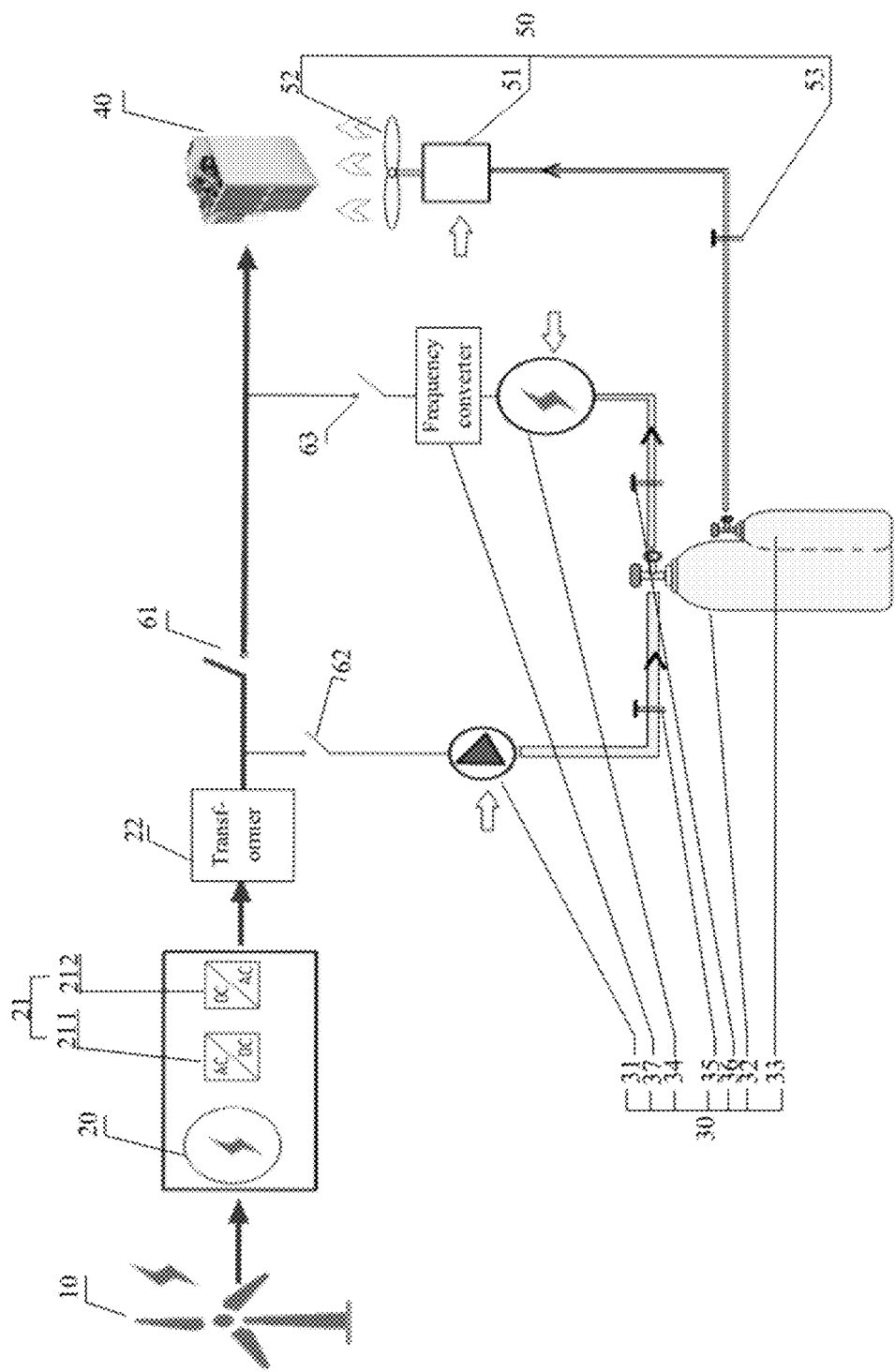
FIG. 3 is a structural schematic diagram of a wind power generation apparatus provided by an embodiment of the present disclosure.

Exemplarily, as shown in FIG. 3, the second gas cylinder 33 can be connected with the first gas cylinder 32, and obtain a gas from the first gas cylinder 32 through the third valve to store the gas.

Figure 4:
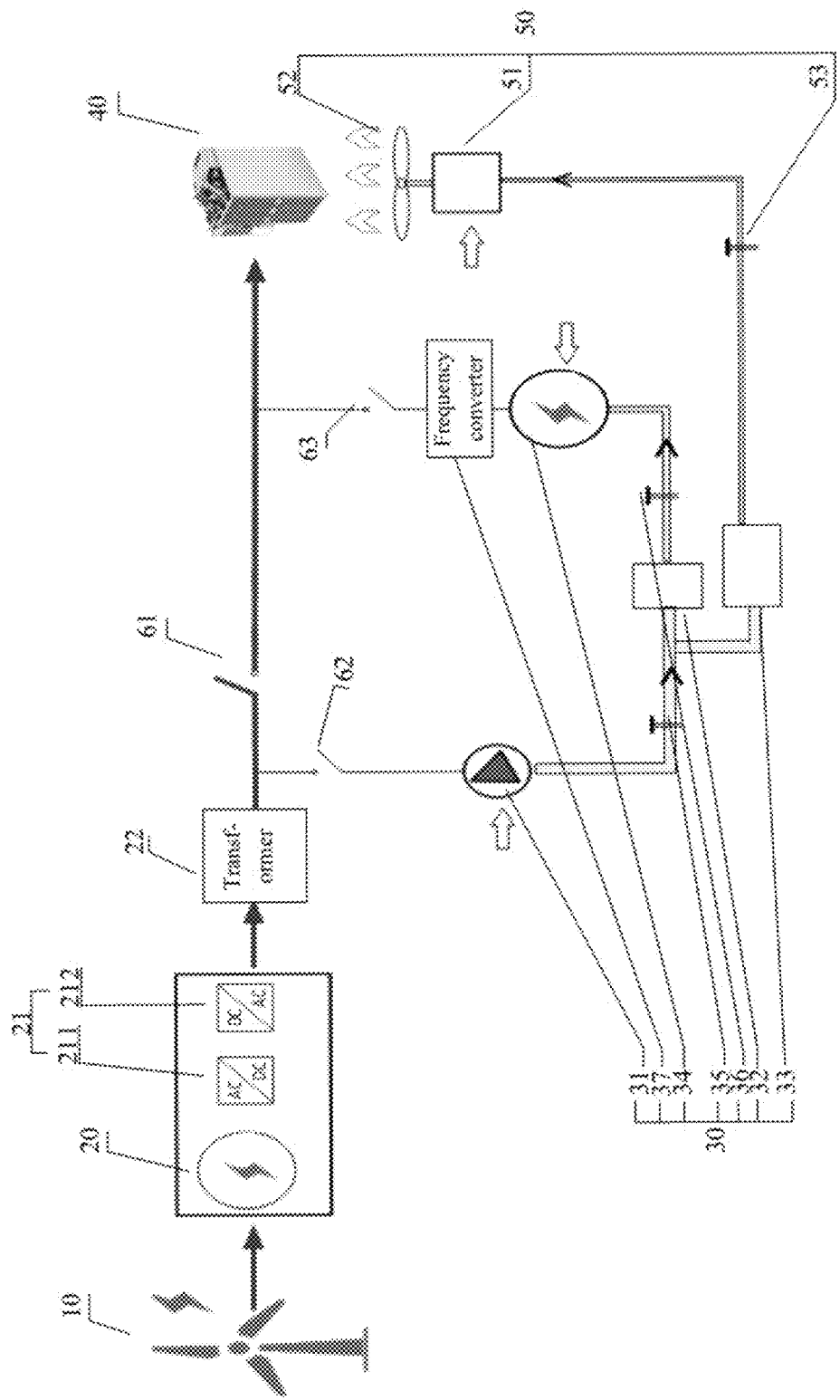
FIG. 4 is another structural schematic diagram of a wind power generation apparatus provided by an embodiment of the present disclosure.

Exemplarily, as shown in FIG. 4, the second gas cylinder 33 and the first gas cylinder 32 each are connected with the air compressor 31 through the first valve 35, and the second gas cylinder 33 directly stores the gas output by the air compressor 31.

Exemplarily, the second gas cylinder 33 can be connected with the first gas cylinder 32 through the third valve (not shown) and with the air compressor 31 through the first valve 35; and thus, while storing, by the third valve, the gas obtained from the first gas cylinder 32, the second gas cylinder 33 stores, by the first valve 35, the gas obtained from the air compressor 31.

Specifically, in some embodiments, the second generator 34 is a turbine generator, and in other embodiments, the second generator 34 may be an impeller generator.

In some embodiments, the wind power generation apparatus further includes a first switch 61, a second switch 62 and a third switch 63;

the first switch 61 is connected between the fan 10 and the load 40.

the second switch 62 is connected between the first generator 20 and the air compressor 31; and the third switch 63 is connected between the second generator 34 and the load 40;

where, when the output power of the first generator 20 is greater than the load power of the load 40, the third switch 63 is turned off and the first switch 61 and the second switch 62 are turned on. and when the output power of the first generator 20 is lower than the load power of the load 40, the second switch 62 is turned off, and the first switch 61 and the third switch 63 are turned on.

In some embodiments, the gas storage module 30 further includes a first valve 35 and a second valve 36;

the first valve 35 is arranged between the air compressor 31 and the first air cylinder 32; and the second valve 36 is arranged between the first gas cylinder 32 and the second generator 34, and is configured to control a first gas release amount of the first gas cylinder 32 when releasing gas;

where, when the air compressor 31 compresses a gas to the first gas cylinder 32, the first valve 35 is opened and the second valve 36 is closed; and when the first gas cylinder 32 releases a gas, the second valve 36 is opened and the first valve 35 is closed.

In an embodiment, taking FIG. 3 as an example, an output power of the first generator 20 is denoted by $P_1$, a load power is denoted by $P_{load}$, and the second electric energy is denoted by $P_2$; an extra power generated by the first generator is denoted by $P_3$; a real-time power of the air compressor is $P_4$; a real-time gas pressure in the first gas cylinder is denoted by $P_{cylinder\ 1}$, a maximum gas pressure of the first gas cylinder is denoted by $P_{cylinder\ 1\ max}$, and a minimum gas pressure of the first gas cylinder is denoted by $P_{cylinder\ 1\ min}$; a real-time gas pressure in the second gas cylinder is denoted by $P_{cylinder\ 2}$, a maximum gas pressure of the second gas cylinder is denoted by $P_{cylinder\ 2\ max}$, and a minimum gas pressure of the second gas cylinder is denoted by $P_{cylinder\ 2\ min}$.

Here, the output power $P_1$, the load power $P_{load}$, the second electric energy $P_2$, the real-time power of the air compressor $P_4$, the extra power generated by the first generator $P_3$, the real-time gas pressure in the first gas cylinder $P_{cylinder\ 1}$ and the real-time gas pressure in the second gas cylinder $P_{cylinder\ 2}$ are all monitored in real time by an energy management system.

In a possible embodiment, when the output power of the first generator 20 $P_1$ is greater than the load power of the load $P_{load}$, the third switch 63 is turned off, the first switch 61 and the second switch 62 are turned on, and the first electric energy generated by the first generator 20 is directly supplied to the load 40. At this time, the first valve 35 is opened and the second valve 36 is closed. The energy management system adjusts the real-time power $P_4$ of the air compressor 31 in real time according to the extra power generated by the first generator $P_3$, and compresses air into the first gas cylinder 32, the first gas cylinder 32 stores the air, here, $P_3=P_1-P_{load}$, and $P_3=P_4$; the second gas cylinder 33 and the first gas cylinder 32 are connected through a third valve (not shown); and when the first gas cylinder 32 is storing gas, the second gas cylinder 33 obtains the gas from the first gas cylinder 32 and stores it.

It should be noted that when the output power $P_1$ of the first generator 20 is greater than the load power of the load $P_{load}$ and the gas pressure $P_{cylinder\ 1}$ in the first gas cylinder 32 reaches the maximum gas pressure of the first gas cylinder $P_{cylinder\ 1\ max}$, the energy management system sends an instruction to the gas cylinder module to control a pressure relief valve (not shown) in the first gas cylinder 32 to open until the output power of the first generator $P_1$ is lower than or equal to the load power of the load $P_{load}$; at the same time, the energy management system detects the output power generated by the first generator $P_1$ every preset time until the output power $P_1$ generated by the first generator 20 is lower than or equal to the load power $P_{load}$ and then the pressure relief valve in the first gas cylinder 32 will be closed;

where, the preset time can be a system default value, or can be set by an user according to an actual situation; for example, the preset time can be 10 seconds or 15 seconds, and is not specifically limited here.

In another possible embodiment, when the output power $P_1$ of the first generator 20 is lower than the load power of the load $P_{load}$, the second switch 62 is turned off, and the first switch 61 and the third switch 63 are turned on. While the first generator 20 generates the first electric energy and outputs it to the load 40, the energy management system controls the first gas cylinder 32 to release gas to drive the second generator 34 to work so as to generate the second electric energy $P_2$, which is output to the load 40, where $P_{load}=P_1+P_2$; at this time, the first valve 35 is closed and the second valve 36 is opened. It should be noted that the energy management system controls the second valve to dynamically control a first gas release amount when the first gas cylinder releases gas; a working power of the second generator, i.e., the generated second electric energy, is proportional to the first gas release amount.

The gas storage module 30 further includes a frequency converter 37;

specifically, since the second generator 34 generates electricity based on the gas released by the first gas cylinder 32, there is certain instability, and the frequency converter 37 may control and dynamically adjust the second electric energy generated by the second generator 34 to provide a stable electric energy for the load.

It should be noted that in a possible embodiment, if the output power generated by the first generator $P_1$ is lower than the load power $P_{load}$, and the gas in the first gas cylinder 32 reaches the minimum gas pressure of the first gas cylinder $P_{cylinder\ 1\ min}$, the load 40 stops operating.

In an embodiment, if gas in the first gas cylinder 32 reaches the minimum gas pressure of the first gas cylinder $P_{cylinder\ 1\ min}$, if the fan 10 is in a working state and the output power generated by the first generator $P_1$ is still lower than the load power $P_{load}$, the second switch 62 is turned on, the first switch 61 and the third switch 63 are turned off, the first valve 35 is opened and the second valve 36 is closed; the energy management system controls the real-time power of the air compressor 31 $P_4$ according to the output power $P_1$ of the first generator 20 under the drive of the output power $P_1$ of the first generator 20, and compresses air to the first gas cylinder 32, and the first gas cylinder 32 stores the gas until the output power $P_1$ generated by the first generator 20 is greater than or equal to the load power $P_{load}$, that is, $P_1 \geq P_{load}$, then the load starts working again; or the gas pressure $P_{cylinder\ 1}$ in the first gas cylinder 32 drives the second generator 34 to work so as to generate the second electric energy $P_2$ that can satisfy the operation of the load 40, that is, the second electric energy $P_2$ generated by the second generator 34 is greater than or equal to $P_{load}$, and then the load 40 is driven by the second electric energy $P_2$ to work again.

The pneumatic heat dissipation module 50 includes a pneumatic motor 51 and a heat dissipation fan 52;

the pneumatic motor 51 is connected with the second gas cylinder 33 and the heat dissipation fan 52, and is configured to provide a driving power for the heat dissipation fan 52 under drive of a gas released from the second gas cylinder 33; and the heat dissipation fan 52 is configured to dissipate heat of the load 40.

The pneumatic heat dissipation module further includes a fourth valve 53;

the fourth valve 53 is arranged between the second gas cylinder 33 and the pneumatic motor 51, and is configured to control a second gas release amount of the second gas cylinder 33 when releasing gas.

Specifically, the driving power required by the heat dissipation fan is represented by $P_{fan}$; the second gas cylinder 33 and the first gas cylinder 32 are connected through the third valve, and the second gas cylinder 33 obtains gas from the first gas cylinder 32; if the driving power generated by the gas pressure in the second air cylinder $P_{cylinder\ 2}$ is greater than or equal to $P_{fan}$, the fourth valve 53 is opened, so that the second air cylinder releases gas to drive the pneumatic motor, and then the pneumatic motor drives the heat dissipation fan to dissipate heat of the load; here, the third valve may be in a closed state or an open state.

If the driving power generated by the gas pressure in the second gas cylinder $P_{cylinder\ 2}$ is lower than $P_{fan}$, the fourth valve 53 is closed and the third valve is opened, so that the second gas cylinder 33 stores the gas obtained from the first gas cylinder 32.

In another embodiment, for example, as shown in FIG. 4, the second gas cylinder 33 and the first gas cylinder 32 are respectively connected with the air compressor 31 through the first valve 35, and when the first valve 35 is opened, the second gas cylinder 33 directly stores the gas output by the air compressor 31. If the driving power generated by the gas pressure in the second air cylinder $P_{cylinder\ 2}$ is greater than or equal to $P_{fan}$, the fourth valve 53 is opened, so that the second air cylinder releases gas to drive the pneumatic motor, and then the pneumatic motor drives the heat dissipation fan to dissipate heat of the load;

if the driving power generated by the gas pressure in the second gas cylinder $P_{cylinder\ 2}$ is lower than $P_{fan}$, the fourth valve 53 is closed, so that the second gas cylinder stores the gas output by the air compressor 31 until the driving power generated by the gas pressure in the second gas cylinder $P_{cylinder\ 2}$ is greater than or equal to $P_{fan}$.

It should be noted that when a driving power of the gas pressure in the second gas cylinder $P_{cylinder\ 2}$ for driving the pneumatic motor is greater than or equal to $P_{fan}$, and the gas pressure in the second gas cylinder $P_{cylinder\ 2}$ reaches the maximum gas pressure of the second gas cylinder $P_{cylinder\ 2\ max}$, the energy management system sends an instruction to the gas storage module so as to control a pressure relief valve (not shown) in the second gas cylinder 33 to open until the gas pressure in the second gas cylinder $P_{cylinder\ 2}$ is lower than the maximum gas pressure of the second gas cylinder $P_{cylinder\ 2\ max}$.

To sum up, the wind power generation apparatus provided by the present embodiment does not need to limit, through a battery cooperated with an unloader or a pitch, a power generated by the wind power generation system, and the electric energy is stored by a compressed gas, instead of a battery, which reduces the complexity and cost of the system and reduces potential safety hazards. By connecting a gas storage module between a first generator and a load, when an output power of the first generator is greater than a load power of the load, the first generator drives the gas storage module to store a gas; and when the output power of the first generator is lower than the load power, the gas storage module releases a stored gas to generate second electric energy and outputs the second electric energy to the load. In this way, a working mode of the gas storage module is dynamically adjusted according to the output power of the first generator and the load power required by the load side in the wind power generation system. When the output power is greater than the load power, the output power that is generated by the first generator and exceeds a load capacity of the load is consumed by the gas storage module and converted into a gas to be stored, thereby protecting the load device without using a battery and an unloader, and improving the safety while reducing the cost; when the output power is lower than the load power, the gas is released to generate second electric energy to directly compensate the electric power for the load.

In the description of the present disclosure, the description referring to the terms "one embodiment", "some embodiments", "example", "specified example" or "some examples" means that the specific features, structures, materials or characteristics described in connection with the embodiment(s) or example(s) are included in at least one embodiment or example of the present disclosure. In the present disclosure, the schematic expression of the above terms is not necessarily aimed at the same embodiment or example. Moreover, the specific features, structures, materials or characteristics described may be combined in any one or more embodiments or examples in a suitable manner. In addition, in the case that there is no contradiction, those skilled in the art can combine different embodiments or examples described and the features therein in the present disclosure.

The above are only some possible embodiments of the present disclosure, and are not used to limit the present disclosure. For those skilled in the art, the present disclosure can be modified and varied. Any modifications, equivalent substitutions, improvements, etc. made within the spirit and principle of the present disclosure shall be included in the protection scope of the present disclosure.

Those skilled in the art will easily think of other embodiments of the present disclosure after considering the specification and implementing the present disclosure disclosed herein. The present disclosure is intended to cover any variations, uses or adaptive changes of the present disclosure, and these variations, uses or adaptive changes follow the general principles of the present disclosure and include common senses or common technical means in this technical field that are not disclosed in the present disclosure. The specification and examples are to be regarded as exemplary only, with the true scope and spirit of the present disclosure being indicated by the claims.

It should be understood that the present disclosure is not limited to the precise structures described above and shown in the drawings, and various modifications and changes can be made without departing from its scope. The scope of the present disclosure is defined only by the appended claims.

What is claimed is:

1. A wind power generation apparatus, comprising:
    a fan, configured to obtain a wind energy;
    a first generator, connected with the fan and a load and configured to convert the wind energy obtained by the fan into a first electric energy and output the first electric energy to the load; and
    a gas storage module, connected between the first generator and the load and configured to store or release a gas;
    wherein the output electric energy of the first generator is greater than the load electric energy of the load, the first generator drives the gas storage module to store the gas;
    when the output electric energy of the first generator is lower than the load electric energy, the gas storage module releases the stored gas to and generate a second electric energy and output the second electric energy to the load;
    wherein the wind power generation apparatus further comprises a pneumatic heat dissipation module;
    the pneumatic heat dissipation module is connected with the gas storage module and is configured to dissipate a heat for the load based on the gas released by the gas storage module;
    wherein the gas storage module comprises an air compressor, a first gas cylinder and a second generator;

the air compressor is respectively connected with the first generator and the first gas cylinder and is configured to compress the gas to the first gas cylinder under a drive of the first generator;

the second generator is connected with the first gas cylinder and the load, and is configured to generate the second electric energy under drive of the gas released by the first gas cylinder and output the second electric energy to the load.

2. The wind power generation apparatus according to claim 1, wherein the gas storage module further comprises a first valve and a second valve;

the first valve is arranged between the air compressor and the first gas cylinder; and the second valve is arranged between the first gas cylinder and the second generator and is configured to control a first gas release amount of the first gas cylinder when releasing the gas;

wherein the air compressor compresses the gas to the first gas cylinder, the first valve is opened and the second valve is closed; when the first gas cylinder releases the gas, the second valve is opened and the first valve is closed.

3. The wind power generation apparatus according to claim 1, wherein the wind power generation apparatus further comprises a first switch, a second switch and a third switch;

the first switch is connected between the fan and the load;

the second switch is connected between the first generator and the air compressor; and the third switch is connected between the second generator and the load;

wherein the output electric energy of the first generator is greater than the load electric energy of the load, the third switch is turned off, and the first switch and the second switch are turned on; and when the output electric energy of the first generator is lower than the load electric energy, the second switch is turned off, and the first switch and the third switch are turned on.

4. The wind power generation apparatus according to claim 1, wherein the gas storage module further comprises: a second gas cylinder;

the second gas cylinder is connected with the first gas cylinder through a third valve; and/or, the second gas cylinder is connected with the air compressor through a first valve.

5. The wind power generation apparatus according to claim 4, wherein the pneumatic heat dissipation module comprises a pneumatic motor and a heat dissipation fan;

the pneumatic motor is connected with the second gas cylinder and the heat dissipation fan, and is configured to provide a driving power for the heat dissipation fan under drive of the gas released by the second gas cylinder;

the heat dissipation fan is configured to dissipate the heat for the load.

6. The wind power generation apparatus according to claim 5, wherein the pneumatic heat dissipation module further comprises a fourth valve; and the fourth valve is arranged between the second gas cylinder and the pneumatic motor, and is configured to control a second gas release amount of the second gas cylinder when releasing the gas.

7. The wind power generation apparatus according to claim 1, wherein the second generator is a turbine generator.

8. The wind power generation apparatus according to claim 7, wherein the gas storage module further comprises a first valve and a second valve;

the first valve is arranged between the air compressor and the first gas cylinder; and the second valve is arranged between the first gas cylinder and the second generator and is configured to control a first gas release amount of the first gas cylinder when releasing the gas;

wherein, when the air compressor compresses the gas to the first gas cylinder, the first valve is opened and the second valve is closed; when the first gas cylinder releases the gas, the second valve is opened and the first valve is closed.

9. The wind power generation apparatus according to claim 7, wherein the wind power generation apparatus further comprises a first switch, a second switch and a third switch;

the first switch is connected between the fan and the load;

the second switch is connected between the first generator and the air compressor; and the third switch is connected between the second generator and the load;

wherein the output power of the first generator is greater than the load electric energy of the load, the third switch is turned off, and the first switch and the second switch are turned on; and when the output electric energy of the first generator is lower than the load electric energy, the second switch is turned off, and the first switch and the third switch are turned on.

10. The wind power generation apparatus according to claim 7, wherein the gas storage module further comprises: a second gas cylinder;

the second gas cylinder is connected with the first gas cylinder through a third valve; and/or, the second gas cylinder is connected with the air compressor through a first valve.

11. The wind power generation apparatus according to claim 10, wherein the pneumatic heat dissipation module comprises a pneumatic motor and a heat dissipation fan;

the pneumatic motor is connected with the second gas cylinder and the heat dissipation fan, and is configured to provide a driving power for the heat dissipation fan under drive of a gas released by the second gas cylinder;

the heat dissipation fan is configured to dissipate heat for the load.

12. The wind power generation apparatus according to claim 11, wherein the pneumatic heat dissipation module further comprises a fourth valve; and the fourth valve is arranged between the second gas cylinder and the pneumatic motor, and is configured to control a second gas release amount of the second gas cylinder when releasing gas.

\* \* \* \* \*